US006028552A

United States Patent [19]

Shuguang

[11] Patent Number: 6,028,552

[45] Date of Patent: Feb. 22, 2000

[54] WAVEGUIDE PHASED ARRAY ANTENNA APPARATUS

[75] Inventor: Chen Shuguang, Tokyo, Japan

[73] Assignee: NEC Corporation, Tokyo, Japan

[21] Appl. No.: 09/201,821

[22] Filed: Dec. 1, 1998

[30] Foreign Application Priority Data

Dec. 2, 1997 [JP] Japan .................................... 9-331632

[51] Int. Cl.[7] ............................... H04B 7/185; G01S 5/02

[52] U.S. Cl. .............................................................. 342/372

[58] Field of Search ............................ 342/372; 343/777, 343/778

[56] References Cited

U.S. PATENT DOCUMENTS 3,969,729 7/1976 Nemit ...................................... 343/756

4,044,360 8/1977 Wolfson et al. ........................ 343/754

5,170,140 12/1992 Lowe et al. ............................ 333/157

5,488,380 1/1996 Harvey et al. .......................... 342/368

*Primary Examiner*—Theodore M. Blum

*Attorney, Agent, or Firm*—Sughrue, Mion, Zinn, Macpeak & Seas, PLLC

[57] ABSTRACT

A phase shifter for controlling a phase of a propagating wave from a distributing waveguide to an array of radiating waveguides is disclosed. The phase shifter includes a distributed-constant line coupling the distributing waveguide to the radiating waveguide and a plurality of distributed-constant circuits each providing a different phase-shift characteristic. A micro machine switch selectively connects the distributed-constant circuits to the distributed-constant line depending on a control signal received from outside.

14 Claims, 11 Drawing Sheets

WAVEGUIDE PHASED ARRAY ANTENNA APPARATUS

BACKGROUND OF THE INVENTION

1. Field of the Invention

The present invention relates to a waveguide phased array antenna apparatus and in particular to a waveguide phased array antenna apparatus for changing the phase of an electromagnetic wave propagating through each waveguide thereof.

2. Description of the Prior Art

In recent years, to ensure a radio communication line between a fixed station on the ground and a mobile station such as an automobile or airplane, a mobile satellite communications system with an artificial satellite employed as a transponder has been put into practical use. In this field, a waveguide phased array antenna has been used to automatically track the artificial satellite.

A waveguide phased array antenna is an electronic scanning antenna that scans a radiant beam by electronically changing the phase of the electromagnetic wave supplied to the individual radiating waveguides that make up a radiating waveguide array. A radiant beam means an electromagnetic wave radiated from an antenna in a predetermined direction.

FIG. 1A is a plan view of a conventional waveguide phased array antenna unit. The conventional waveguide phased array antenna unit is composed of a radiating waveguide array 10 with a plurality of radiating waveguides 11 arranged in parallel and each radiating waveguide having a plurality of radiating elements 12. Each of the radiating waveguides 11 is coupled to a phase shifter 13 which is in turn coupled to a power distributor waveguide 14 for distributing the power from a feeding section 15 to each radiating waveguide 11.

The respective phase shifters 13 control the phase of the propagating radio wave. The power is supplied from the feeding section 15 and is distributed to the radiating waveguides 11 through the phase shifters 13. The respective phase shifters 13 control the phases of the propagating radio waves supplied to the radiating waveguides 11 so that the radiating waveguides 11 radiate radiant beams in phase with each other to allow for radiation in phase corresponding to the phase at the feeding point.

Meanwhile, a waveguide ferrite phase shifter is widely used as the phase shifter 13. As a typical example, there is shown a waveguide latching phase shifter in FIGS. 1B and 1C.

The waveguide latching phase shifter is made by using a ferrite toroid 17 having dielectric 18 therein with two ferrite plates integrated to form a closed magnetic path. It is a phase shifter in which use is made of the difference in ferrite magnetic permeability in two magnetized states whose polarity switches in response to a pulsating current flowing through a lead wire 16.

However, the above waveguide latching phase shifter is large in volume. Because it employs a waveguide latching phase shifter as the phase shifter 13, a conventional waveguide phased array antenna unit has a problem in that the unit ultimately becomes large in size.

SUMMARY OF THE INVENTION

An object of the present invention is to provide a waveguide phased a ray antenna apparatus and a phase controller, which can downsize the waveguide phased array antenna apparatus Another object of the present invention is to provide a compact lightweight wageguide phased array antenna apparatus.

According to an aspect of the present invention, a phase controller for controlling a phase of a propagating wave from an input waveguide to an output waveguide includes a distributed-constant line coupling the input waveguide to the output waveguide, a plurality of distributed-constant circuits each providing a different phase-shift characteristic, and a switch for selectively connecting the distributed-constant circuits to the distributed-constant line depending on a control signal received from outside.

The distributed-constant line, the distributed-constant circuits and the switch may be formed on an insulating substrate. Further, the distributed-constant line, the distributed-constant circuits and the switch may be formed within an insulating substrate, wherein the insulating substrate has an input coupler formed on one side thereof and an output coupler formed on the other side thereof, the input coupler coupling the distributed-constant line to the input waveguide, and the output coupler coupling the distributed-constant line to the output waveguide.

The switch may be a mechanically operating switch formed on a substrate having the distributed-constant line and the distributed-constant circuits formed thereon. In other words, the switch may be a micro machine switch.

According to another aspect of the present invention, a waveguide phased array antenna apparatus includes an array of a plurality of radiating waveguides arranged in parallel, and a phase controller including a plurality of phase shifters and a control signal generator. The phase shifters are provided for the radiating waveguides, respectively, and each of the phase shifters shifts a phase of a high-frequency signal propagating from a distributing waveguide to the radiating waveguide. Each of the phase shifters is comprised of a distributed-constant line coupling the distributing waveguide to the radiating waveguide, a plurality of distributed-constant circuits each providing a different phase-shift characteristic, and a switch for selectively connecting the distributed-constant circuits to the distributed-constant line depending on a control signal received from the control signal generator.

As described above, since the phase controller can be formed by strip lines providing distributed constant, it can be downsized, resulting in reduced size of a waveguide phased array antenna apparatus. Further since the switch is mechanically operated, the power consumed In the switch can be reduced.

BRIEF DESCRIPTION OP THE DRAWINGS

DESCRIPTION OF THE PREFERRED EMBODIMENTS

Figure 1A:
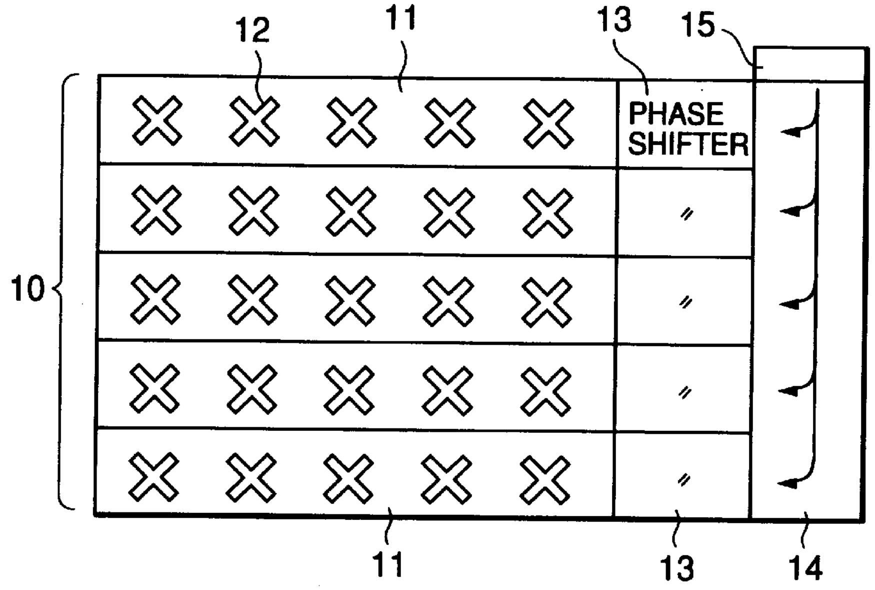
FIG.1A(PRIOR ART)
FIG. 1A is a plan view of a conventional waveguide phased array antenna unit.

Hereinafter, an embodiment of the present invention will be described in detail by referring to the drawings. A case in which an antenna transmits a radio signal is mentioned in the following description, but notice is given in advance that the operating principle is essentially identical in a case in which an antenna receives a radio signal, for reasons of reversibility.

Figure 2:
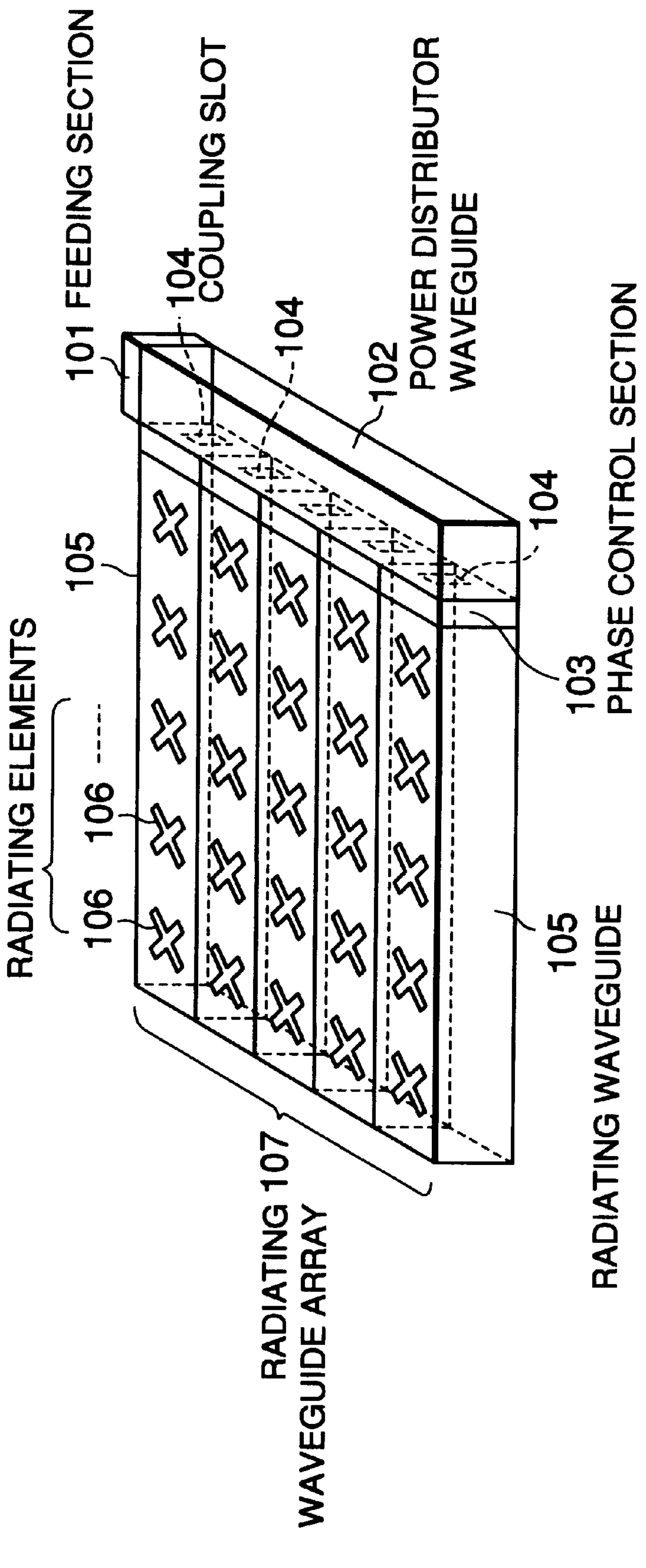

As shown in FIG. 2, a feeding section 101 is coupled to a power distributor waveguide (feeding waveguide) 102 at one end thereof. On one side surface of the power distributor waveguide 102, a phase control section 103 is provided which has a plurality of coupling slots 104 formed at predetermined intervals thereon. The phase control section 103 is shaped like a layer in which a phase shifter is provided for each coupling slot 104.

A plurality of radiating waveguides 105 are each coupled to the phase control section 103. The radiating waveguides 105 each having a plurality of radiating elements 106 formed thereon are arranged in parallel to form a radiating waveguide array 107. Incidentally, the radiating elements 106 are not limited to slot elements but may be microstrip elements

PHASE CONTROL SECTION

Figure 3:
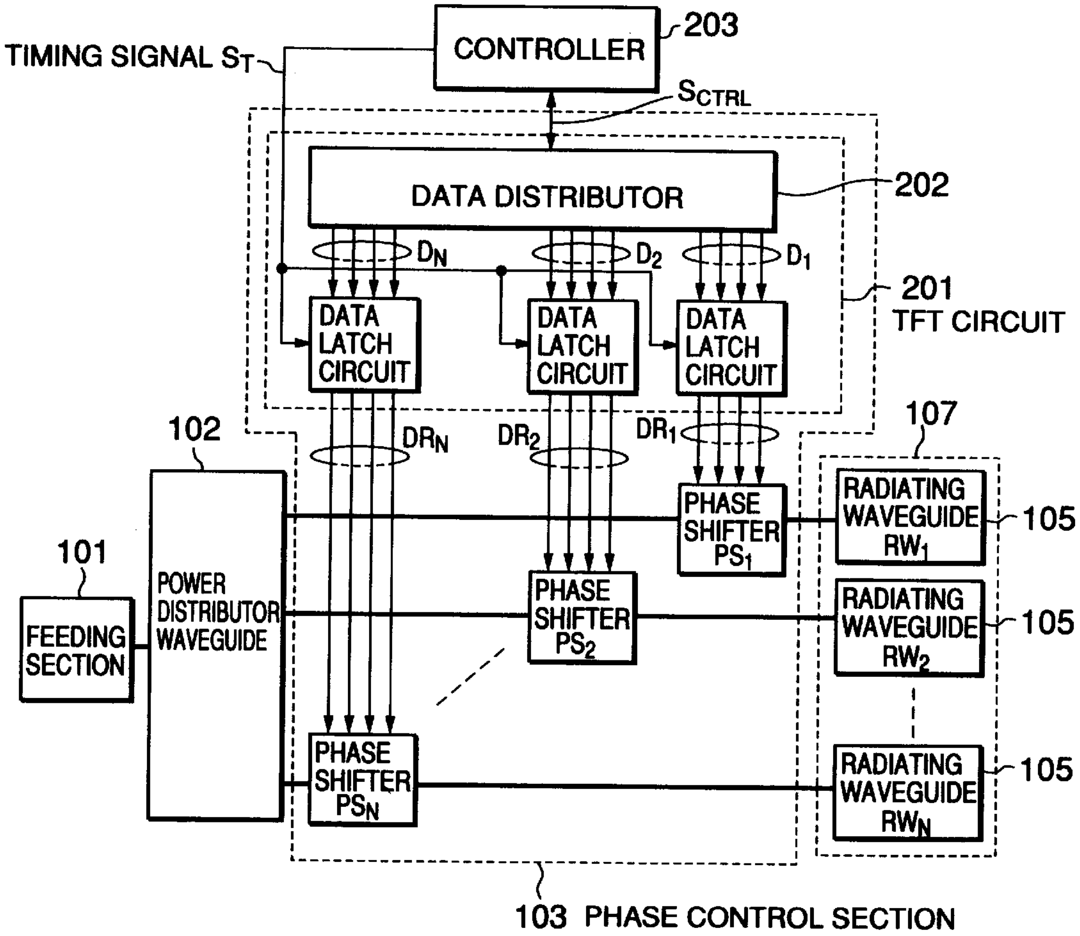
FIG. 3 is a block diagram showing the circuit configuration of a waveguide phased array antenna apparatus according to the present invention.

As shown in FIG. 3, the phase control section 103 includes N phase shifters $PS_1$–$PS_N$ and the radiating waveguide array 107 is composed of N radiating waveguides $RW_1$–$RW_N$ which are coupled to the phase shifters $PS_1$–$PS_N$, respectively. The phase control section 103 further includes a TFT circuit 201 composed of N data latch circuits $LC_1$–$LC_N$ and a data distributor 202. The respective data latch circuits $LC_1$–$LC_N$ are provided corresponding to the phase shifters $PS_1$–$PS_N$. The data distributor 202 and the data latch circuits $LC_1$–$LC_N$ are formed of thin-film transistors and are integrally formed on one and the same substrate (that is why a set of these circuits are referred to as a TFT circuit).

A controller 203 is connected to the data distributor 202 and each of the data latch circuits $LC_1$–$LC_N$ to control the phase shifters $PS_1$–$PS_N$. The controller 203 outputs a control signal $S_{CTRL}$ to the data distributor 202 and a timing signal $S_T$ to each of data latch circuits $LC_1$–$LC_N$. the data distributor 202 outputs control data $D_1$–$D_N$ to the data latch circuits $LC_1$–$LC_N$, respectively. As will be described later, each of the phase shifters $PS_1$–$PS_N$ is provided with a plurality of switch elements (not shown here) which are controlled by the control data received from the corresponding data latch circuit. As described before, the phase shifters $PS_1$–$PS_N$ are connected between the power distributor waveguide 102 and the radiating waveguides $RW_1$–$RW_N$, respectively.

The controller 203 calculates the optimum amount of phase shift needed to direct a radiant beam in a desired direction at each of the radiating waveguides $RW_1$–$RW_N$, and outputs it as the control signal $S_{CTRL}$ to the data distributor 202. The controller 203 further outputs the timing signal $S_T$ to each of data latch circuits $LC_1$–$LC_N$ to change the direction of the beam at a time. The data distributor 202 distributes the control signal $S_{CTRL}$ as control data $D_1$–$D_N$ to the data latch circuits $LC_1$–$LC_N$. In synchronization with the timing signal S, the data latch circuits $LC_1$–$LC_N$ output driving signals $DR_1$–$DR_N$ to the phase shifters $PS_1$–$PS_N$.

On the other hand, the power distributor waveguide 102 distributes the electromagnetic wavered from the feeding section 101 to the phase shifters $PS_1$–$PS_N$. The phase shifters $PS_1$–$PS_N$ are set to provide phase shifts determined by the driving signals $DR_1$–$DR_N$ received from the data latch circuits $LC_1$–$LC_N$, respectively. The phase of an electromagnetic wave passing through each phase shifter is shifted according to the amount of phase shaft thereof. The radiating waveguides $RW_1$–$RW_N$ radiate radiant beams in phase with the electromagnetic wave fed from the feeding section 101.

Next, an operation of the waveguide phased array antenna unit shown in FIG. 3 will be described.

The controller 203 calculates the optimum amount of phase shift with M-bit precision on the basis of the position of a radiating waveguide and the frequency of the electromagnetic wave propagating through the radiating waveguide. The calculated phase shift for each radiating waveguide is output to the data distributor 202, Which distributes it to the data latch circuits $LC_1$–$LC_N$ and then to the phase shifters $PS_1$–$PS_N$ according to the timing signal $S_T$.

Meanwhile, the direction of radiation is not switched gradually for each of the radiating waveguides $RW_1$–$RW_N$. It must be switched simultaneously for all the radiating waveguides $RW_1$–$RW_N$. To do this, each of the data latch circuits $LC_1$–$LC_N$ updates its retained data according to the control signal $S_{CTRL}$ in synchronization with the timing signal $S_T$ to simultaneously apply each driving signal DR to the corresponding phase shifter.

When the driving signal DR is applied to the corresponding phase shifter, as will be described later, the switch elements are selectively closed depending on the driving signal to set the phase shifter to the designated amount of phase shift.

Figure 4:
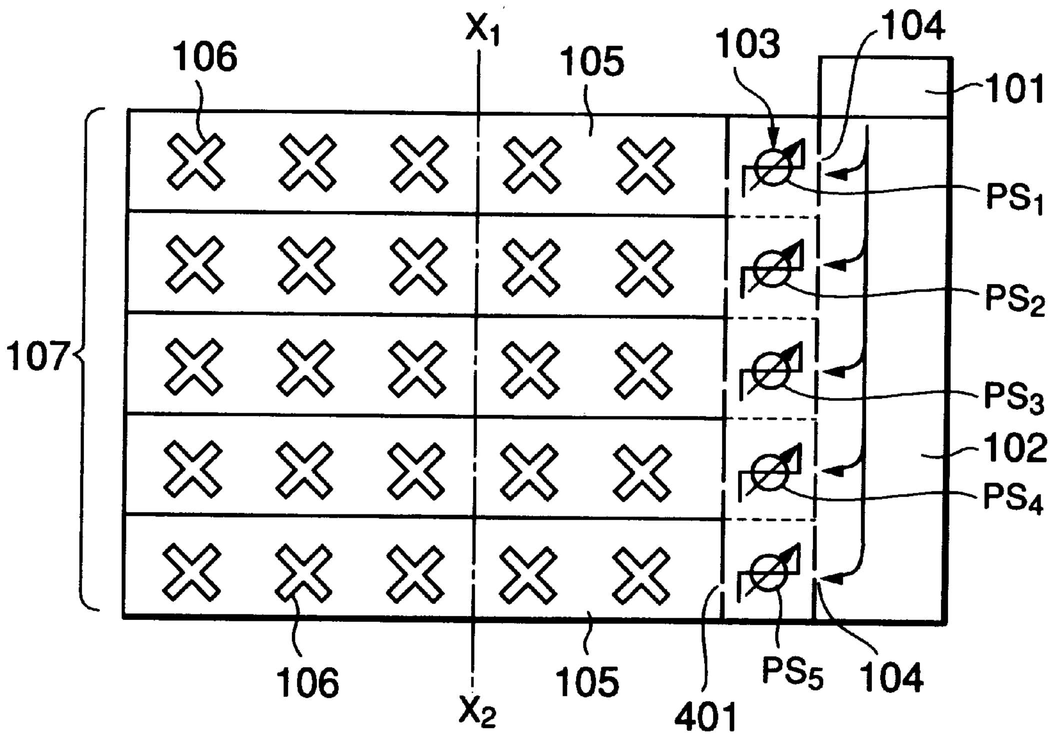
FIG. 4 is an illustration of the waveguide structure of the waveguide phased array antenna apparatus shown in FIG. 2.

Referring to FIG. 4, the electromagnetic wave supplied from the feeding section 101 propagates through the power distributor waveguide 102 to be distributed to the phase shifters $PS_1$–$PS_5$ through the coupling slots 104. Another coupling slot 401 corresponding to each coupling slot 104 is provided on the other side of the phase control section 103.

In accordance with the amount of phase shift set for each phase shifter, the electromagnetic wave coupled to each of the phase shifters $PS_1$–$PS_5$ is changed in phase and is supplied to the corresponding radiating waveguide through the corresponding coupling slot 401. By controlling the amount of phase shift for each phase shifter, the radiant beams are radiated from the radiant elements of each radiating waveguide in phase with the phase at the feeding section 101 to permit a radiation beam to be scanned within a plane including line $X_1$–$X_2$ perpendicular to the radiating waveguide array 107.

Figure 5A:
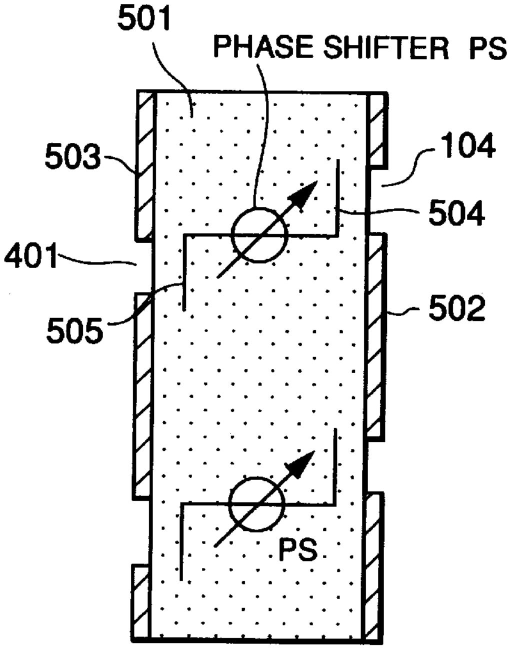
FIG. 5A is a schematic diagram showing a first example of a phase control section in the embodiment.
Figure 5B:
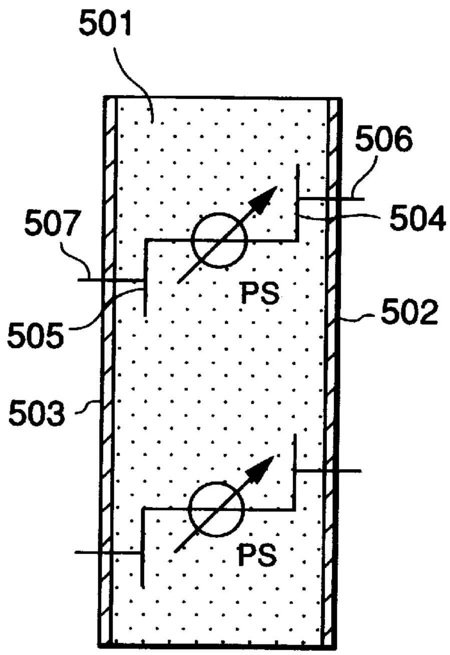
FIG. 5B is a schematic diagram showing a second example of a phase control section in the embodiment.

As shown in FIG. 5A, a phase shifter PS is disposed in a dielectric layer 501 that is sandwiched between grounding conductor plates 502 and 503. The coupling slots 104 and 401 are formed In the grounding conductor plates 502 and 503, respectively. The phase shifter PS has a distributed-constant line connected to coupling lines 504 and 505 facing to the coupling slots 104 and 401 through dielectric layers, respectively. The TFT circuit 201 shown in FIG. 3 is also formed in this dielectric 501.

Each of the coupling slots 104 and 401 is shaped like a rectangle. The coefficient of coupling for each coupling slot can be adjusted by changing the length of their sides.

The nearer a coupling slot 104 is situated to the feeding section 101 the higher the coupling coefficient is. Therefore, by shortening the length of the long sides depending on a distance from the feeding section 101, the coefficients of coupling for all coupling slots 104 can be made uniform. It is the same with the coupling slots 401.

As shown in FIG. 5E, in place of the coupling slots 104 and 401, coupling pins 506 and 507 may be formed. In this case, by changing the protruding length of a coupling pin into the power distributor waveguide 102, the coupling amount of the coupling pin 506 can be adjusted. Accordingly, by making the protruding length in the power distributor waveguide 102 shorter depending on the distance from the feeding section 101, the coupling amount of all coupling pins 506 and 507 can be made uniform.

Figure 6:
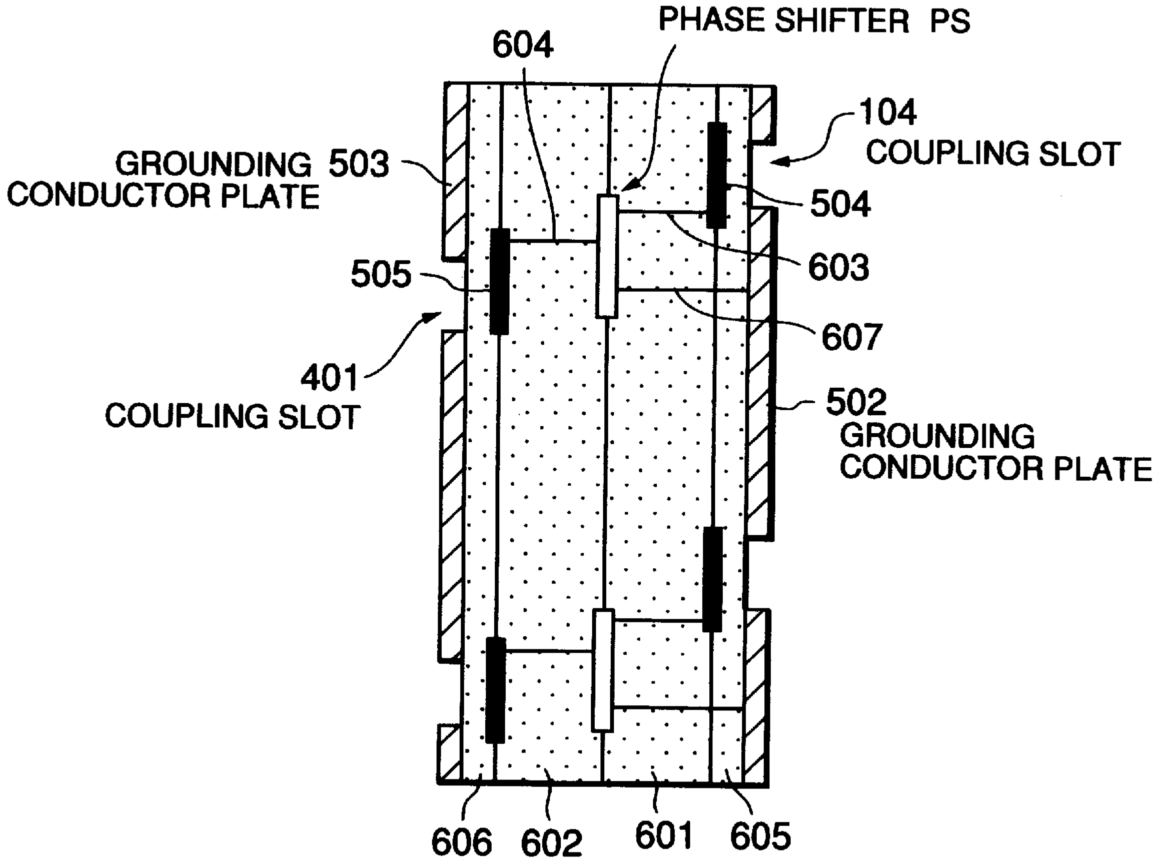
FIG. 6 is a cross sectional view showing the first example of the phase control section as shown in FIG. 5A.

Referring to FIG. 6, in thus embodiment, a phase shifter PS is sandwiched between a dielectric layers 601 and 602. A microstrip connected to the phase shifter PS Is connected to a coupling line 504 through a via hole 603 and to a coupling line 505 through a via hole 604. The coupling lines 504 and 505 face the coupling slots 104 and 401 through a dielectric layer 605 and 606, respectively. Further, the grounding conductor of the phase shifter PS is connected to the grounding conductor plate 502 through a via hole 607.

The phase shifters $PS_1$–$PS_N$, the microstrip thereof and the data latch circuits $LC_1$–$LC_N$ are formed on the same substrate. The circuit of the phase shifter PS will be described in detail.

PHASE SHIFTER

Figure 7:
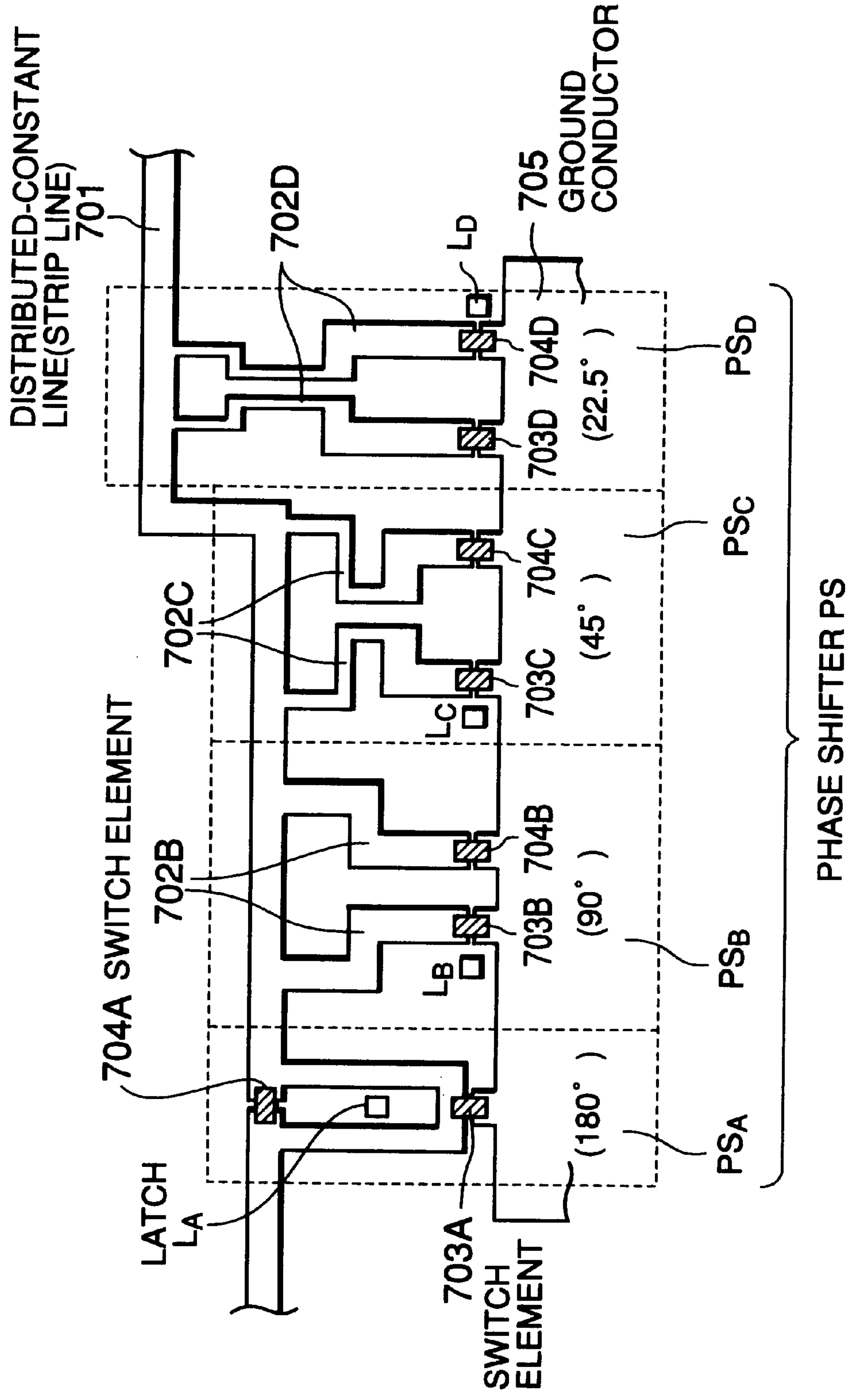
FIG. 7 is a circuit diagram showing an embodiment of a phase shifter according to the present Invention.

Referring to FIG. 7, a phase shifter PS is a 4-bit phase shifter, which is composed of four phase shift sections $PS_A$, $PS_B$, $PS_C$, and $PS_D$ corresponding to phase shifts: 180°, 90°, 45° and 22.5°, respectively. The phase shift sections $PS_A$, $PS_B$, $PS_C$, and $PS_D$ are connected in cascade to a strip line 701 which is a distributed-constant line such as a micro strip, a triplate line, a coplanar line or a slot line.

The strip line 701 is printed to form wiring from the position corresponding to the coupling slot 104 on the substrate to the position corresponding to the coupling slot 401 on the substrate. This strip line 701 is connected to the coupling lines 504 and 505 through the via holes 603 and 604, respectively.

The phase shift sections $PS_A$, $PS_B$, $PS_C$, and $PS_D$ have different strip line patterns 702A, 7023, 702C and 702D to provide the different phase shifts: 180°, 90°, 45° and 22.5°, respectively. The strip line patterns 702A, 702B, 702C and 702D are connected in cascade to the strip line 701 as shown in FIG. 7. Each of the strip line patterns 702A, 702B, 702C and 702D is composed of a distributed-constant line such as a micro strip, a triplate line, a coplanar line or a slot line.

In the phase shift section $PS_A$, the strip line pattern 702A is a U-shaped strip line, the ends of which are connected to the ends of the broken strip line 701. At a center point of the U-shaped strip line 702A, one micro machine switch 703A is arranged so as to connect the U-shaped strip line 702A to the grounding conductor 705. At the ends of the broken strip line 701, the other micro machine switch 704 is arranged so as to connect the ends of the broken strip line 701.

In the phase shift sections $PS_B$, $PS_C$, and $PS_D$, each of the strip line patterns 702B–702D is composed of two strip lines which are directly connected to the strip line 701 and are connected to the ground conductor 705 through two micro madline switches. More specifically, in the phase shift sections $PS_B$, one micro machine switch 703B connects one of the strip lines 702B to the ground conductor 705 and the other micro machine switch 704B connects the other of the strip lies 702B to the ground conductor 705. In the phase shift sections PSC, one micro machine switch 703C connects one of the strip lines 702C to the ground conductor 705 and the other micro machine switch 704C connects the other of the strip lines 702C to the ground conductor 705. In the phase shift sections $PS_D$, one micro machine switch 703D connects one of the strip lines 702D to the ground conductor 705 and the other micro machine switch 704D connects the other of the strip lines 702D to the ground conductor 705.

The phase shift section $PS_A$ is of a switched-line type and the other phase shift sections $PS_B$, $PS_C$, and $PS_D$ are of a loaded-line type. In general, a better characteristic is obtained with the switched-line type for a large amount of phase shift, while a better characteristic Is obtained with a loaded-line type for a small amount of phase shift. The phase shift sections $PS_A$, $PS_B$, $PS_C$, and $PS_D$ may use another type circuit.

The two micro marine switches included in each of the phase shift sections $PS_A$, $PS_B$, $PS_C$, and $PS_D$ are connected to the corresponding one of latches $L_A$, $L_B$, $L_C$, and $L_D$ disposed near to them. As described later, the latches $L_A$, $L_B$, $L_C$, and $L_D$ are included in each of the data latch circuits $LC_1$–$LC_N$. Actuated simultaneously by the driving signals DR,.D; received from the data latch circuits $LC_1$–$LC_N$, the strip line patterns 702A–702D arc selectively connected to the ground conductor 705 and the broken strip line 701 is connected by the micro machine switch 704A when the micro machine switch 703A is closed.

In this manner, the phase of the propagating wave can be changed depending on how the corresponding phase shifter is set.

Although each latch $L_A$, $L_B$, $L_C$, or $L_D$ is disposed near to the corresponding micro machine switch. The latches $L_A$, $L_B$, $L_C$, and $L_D$ may be disposed all together in one place so that wiring extended therefrom drives the micro machine switches.

DATA LATCH CIRCUIT

Figure 8:
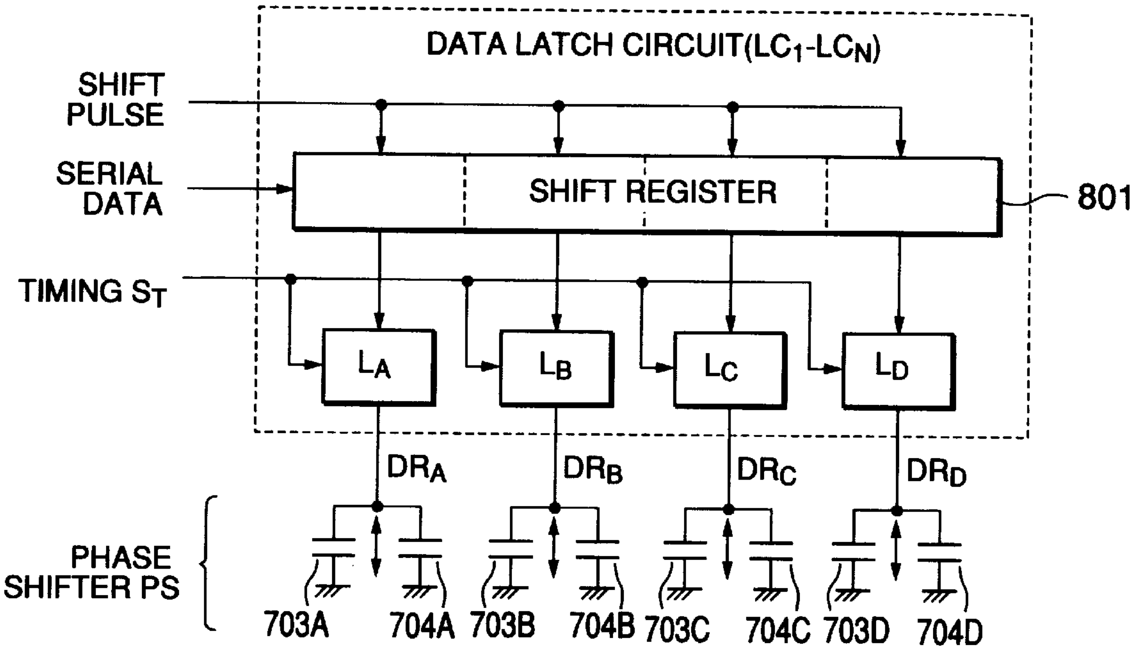
FIG. 8 is a block diagram showing the configuration of a data latch circuit shown in FIG. 3.

Referring to FIG. 8, each of the data latch circuits $LC_1$–$LC_N$ drives the 4-bit phase shifter PS. The data latch circuit Includes a 4-bit shift register 801 and four latches $L_A$, $L_B$, $L_C$, and $L_D$, which are connected to the parallel outputs of the 4-bit shift register 801, respectively. Two micro machine switches or every bit of the phase shifter are connected to the corresponding one of four latches $L_A$, $L_B$, $L_C$, and $L_D$.

Each of the control data $D_1$–$D_N$ may be input as serial data from the data distributor 202 to the corresponding data latch circuit. In this case, the serial data is stored onto the shut register 801 according to a shift pulse received from the controller 203.

The shift register 801 is a serial input/parallel output type shift register, which outputs the 4-bit control data to the latches $L_A$, $L_B$, $L_C$, and $L_D$, respectively. The respective latches $L_A$, $L_B$, $L_C$, and $L_D$ store the 4-bit control data in synchronization with the timing signal $S_T$ and simultaneously output driving signals $DR_A$–$DR_D$ to the micro machine switches for each bit of the phase shifter.

Next, the operation of the data latch circuit will be described. Control data for controlling the drive of individual bits of the corresponding phase shifter is output in serial from the data distributor 202 to the shift register 801 of the data latch circuit. In response to the input of the shift pulse signal, the shift register 801 stores the serial control data from the first bit to the fourth bit Thus, with an M-bit shift register, the control data stored in the shift register 801 are renewed when the shift pulse has been inputted M times. Since the shift register 801 as shown in FIG. 8 is a 4-bit register, as mentioned above, the stored control data is renewed through 4 shift pulses.

When four shift pulses have been sequentially output from the controller 203 and the control data stored in the shift register 801 has been renewed, the timing signal $S_T$ used for switching the beam direction is output to the latches $L_A$, $L_B$, $L_C$, and $L_D$. Upon receipt of this timing signal $S_T$, the latches $L_A$, $L_B$, $L_C$, and $L_D$ retain the four bits of the control data received in parallel from the shift register 801 at a time, and output driving signals $DR_A$, $DR_B$, $DR_C$, and $DR_D$ to the individual bits of the shift register PS. In this manner, the radiation directions of all radiating waveguides $RW_1$–$RW_N$ can be switched simultaneously.

Figure 1B:
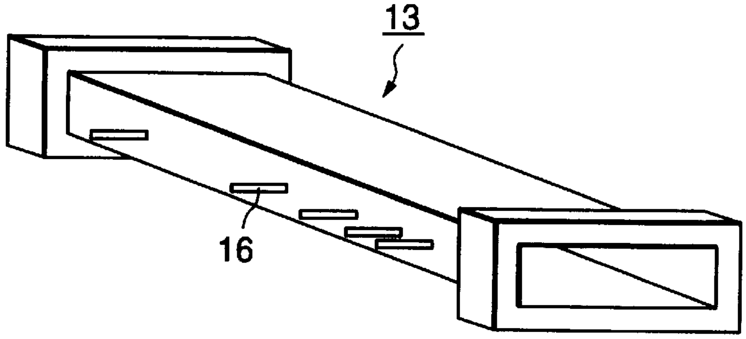
FIG.1B(PRIOR ART)
FIG. 1B is a perspective view of a conventional waveguide latching phase shifter.
Figure 1C:
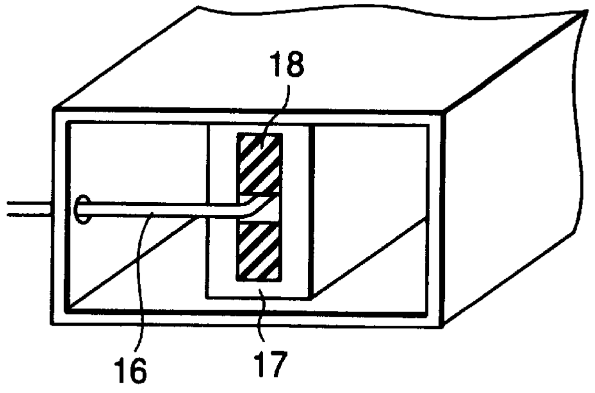
FIG.1C(PRIOR ART)
FIG. 1C is a partially cutaway perspective view of the conventional waveguide latching phase shifter, FIG. 2 as a perspective view of a waveguide phased array antenna unit according to an embodiment of the present invention.

The data distributor 202 may deliver control data in parallel for each of the bits of a phase shifter as shown in FIG. 1. However, the serial delivery of control data as shown in FIG. 8 permits the number of interconnections between the data distributor 202 and the data latch circuits $LC_1$–$LC_N$ to be reduced.

The shift register 801 as shown in FIG. 8 is provided for each phase shifter PS, but by using a shift register with a great number of bits, one shift register can be made to take charge of a plurality of phase shifters. At this time, a data latch circuit would control the driving of a plurality of phase shifters.

MICRO MACHINE SWITCH

Next, a micro machine switch for use in a phase shifter will be described further.

Figure 9:
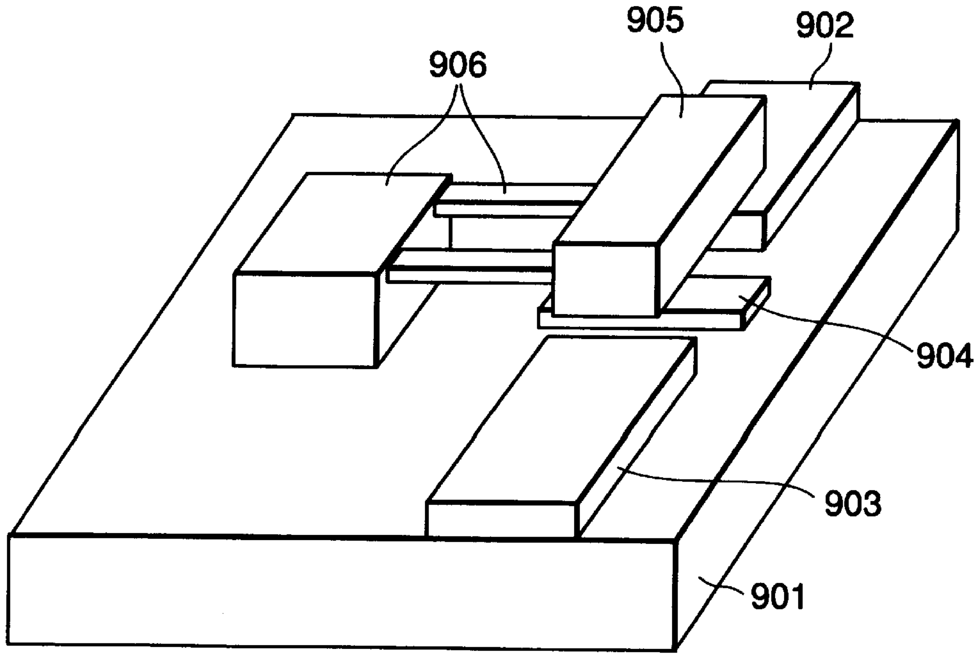
FIG. 9 is a perspective view showing the structure of a micro machine switch shown in FIG. 7.

Referring to FIG. 9, a micro machine switch is formed on a substrate 901 between a strip line 902 and a ground connection 903. The micro machine switch is comprised of an electrode 904, a minute movable element 905 and a support member 906. Together, minute movable element 905 and the support member 906 are referred to as a cantilever.

The strip line 902 and the ground connection 903 are formed apart from each other on the substrate 901. The electrode 904 is formed on the substrate 901 between the strip line 902 and the ground connection 903 by the printed-wiring technique. However, the electrode 904 is not kept in contact with either the strip line 902 or with the ground connection 903. The strip line 902 and the ground connection 903 are both formed at the same height, while the electrode 904 is formed sufficiently lower than them.

A minute movable element 905 is formed above the electrode 904 and opposed to the strip line 902, the ground connection 903 and the electrode 904. The support member 906 is formed on the substrate 901 and supports the minute movable element 905 at one end only. The electrode 904 and the minute movable element 905 are made of a conductor, but the support member 906 may be made of a conductor, semiconductor or insulator.

Figure 10:
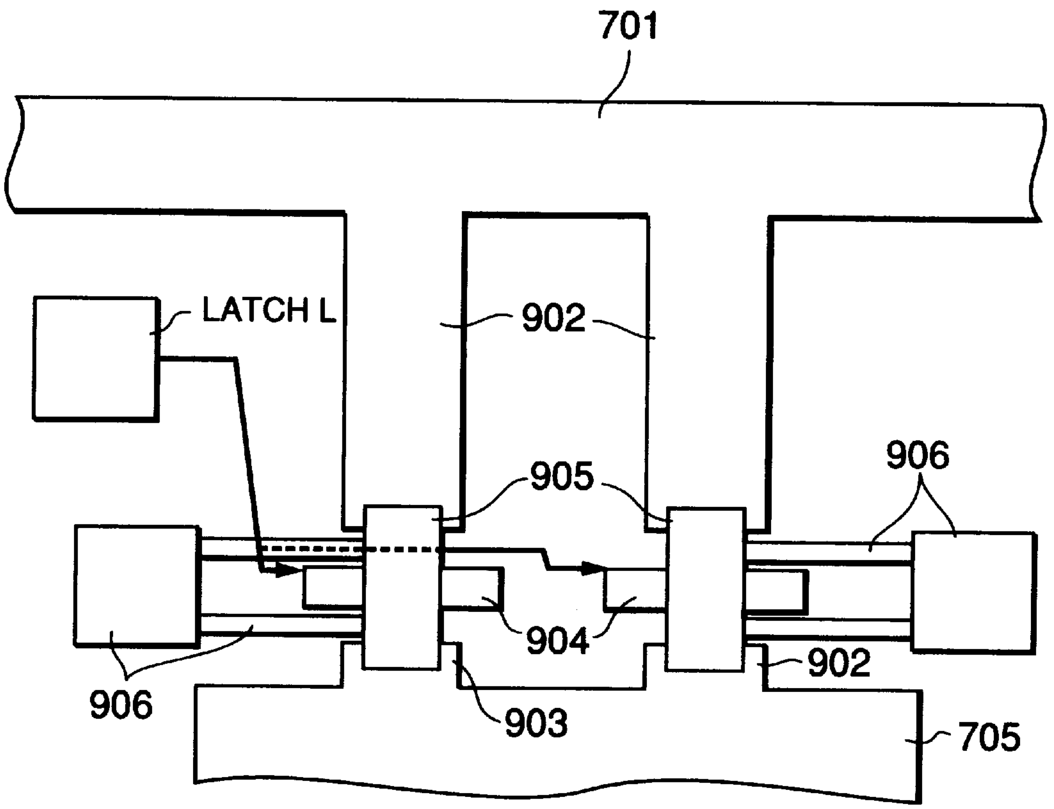
FIG. 10 is a plan view of the micro machine switch shown in FIG. 9.

As shown in FIG. 10, two micro machine switches as mentioned above are used in the loaded-line type phase shifter. Two micro machine switches are positioned symmetrically around the metrical line of two strip lines 902 which are connected to the strip line 701. The respective electrodes 904 included in two micro machine switches are connected to the output terminals of the latch, to which the driving signals are stored simultaneously as described above.

Figure 11A:
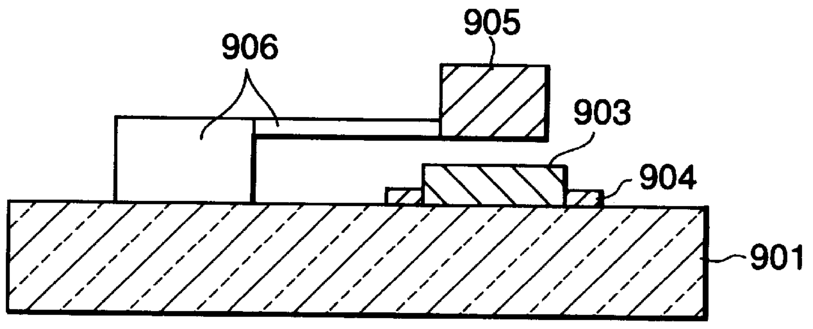
FIG. 11A is a sectional view of the micro machine switch in open state.
Figure 11B:
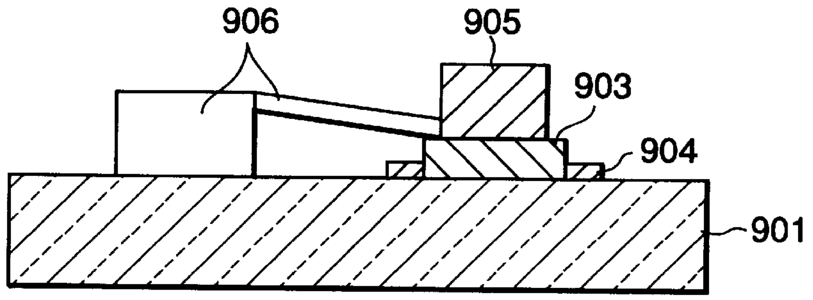
FIG. 11B is a sectional view of the micro machine switch in closed state.

Next, the operation of a micro machine switch will be described referring to FIGS. 11A and 11B.

First, when control data of the logic level “L” is output from the data distributor 202, the latch L applies no driving voltage to the electrode 904. At this time, since the minute movable element 905 is situated above the strip line 902 and the ground connection 903 as shown in FIG. 11A. Therefore, the minute movable element 905 is not in contact with the strip line 902 or the ground connection 903, that is, the micro machine Ditch is open.

Since the electrode 904 is disposed so as not to be in contact with the strip line 902 or the ground connection 903 as mentioned above, the strip line 902 is open. At this time, since the phase shifter sections do not operate and none of the power flowing through the strip line 701 flows from the strip line 902 to the ground connection 903, that is, the phase of the propagating wave does not change.

When control data of logic level “H” is output from the data distributor 202, the latch L applies a driving voltage to the electrode 904. At this time, the driving voltage applied to the electrode 904 is on the order of 30 V or lower. When such a positive driving voltage is applied to the electrode 904, positive charges appear on the surface of the electrode 94 and negative charges appear on the surface of the minute movable element 905 opposed to the electrode 904 by electrostatic induction Since an attractive force is generated by the electrostatic force between the electrode 904 and the minute movable element 905, the minute movable element 905 is pulled down toward the electrode 904 by this attractive force as shown in FIG. 11B.

Since the minute movable element 905 comes into contact with the strip line 902 and the ground connect-ton 903, the micro machine switch becomes closed and the strip line 902 comes into electromagnetically contact with the ground connection 903 via the minute movable element 905. At this time, since the phase shift sections $PS_B$–$PS_D$ operate and the power flowing through the strip line 701 also flows to the ground connection 903, the phase of the propagating wave is changed.

Also, with respect to a switched-line type phase shift section $PS_A$, upon selectively applying the driving voltage to the electrode 904 of a micro machine switch in a similar manner, the minute movable element 905 selectively either connects the strip line 902 to the ground connection 903 or connects the broken strip line 701. Therefore, power flows therethrough, so that the phase of the propagating wave is changed.

Meanwhile, since the electrode 904 is sufficiently lower in level than the strip line 902 and the ground connection. 903 as mentioned above, the minute movable element 905 never comes into contact with the electrode 904 When brought into contact with the strip line 902 and the ground connection 903.

With the micro machine switch as shown in FIG. 9, the minute movable element 905 is supported by the support member 906 at one end. Needless to say, however, one supported at both ends may be employed.

Furthermore, the micro machine switch as shown in FIG. 9 is of the ohmic-coupling type. However, a capacitive-coupling type micro machine switch using a cantilever with a dielectric film formed on the lower surface of the minute movable element 905 may be used.

With the micro machine switch as shown in FIG. 9, a driving voltage is applied to the electrode 904, but a driving voltage may be applied to the minute movable element 905 with the output side of the latch L connected to the minute movable element 905 so that an electrostatic force is generated between the electrode 904 and the minute movable element 905.

A PIN diode commonly used as the switch element for a phase shifter was disadvantageous in that a large energy loss on the semiconductor junction resulted in a large power consumption. With phase shifters as shown in FIG. 7, however, since a micro machine switch is used as the switch element as described already, the power consumed in a switch element can be reduced to an extent that it Is one tenth or less. Incidentally, even in the present invention, a PIN diode may be used as the switch element if the problem of power consumption is ignored.

Figure 12:
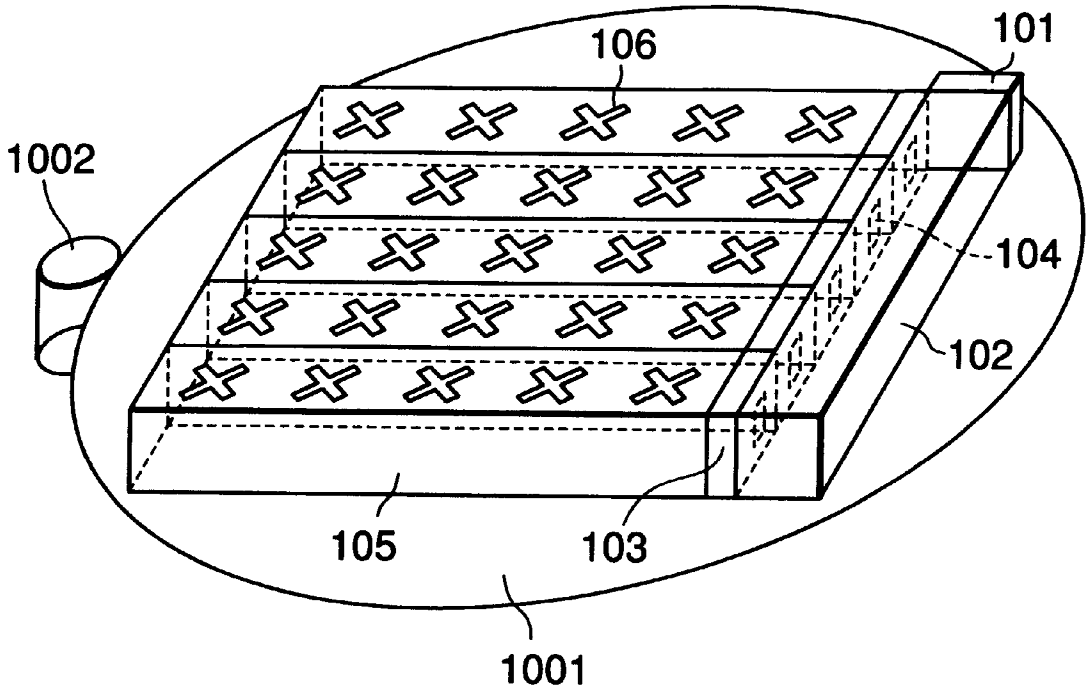
FIG. 12 is a perspective view of a waveguide phased array antenna apparatus according to another embodiment of the present invention.

As mentioned above, a waveguide phased array antenna unit shown in FIG. 2 can scan a radiant beam only in one direction. However, as shown in FIG. 12, by installing this waveguide phased array antenna unit on the turn plate 1001 rotating by a rotation motor 1002, the direction of a radiant beam can be controlled mechanically in the azimuthal direction and electronically in the elevation direction.

As described above, according to the present invention, a phase shifter is comprised of a distributed-constant line and a plurality of distributed-constant circuits which are selectively connected to the distributed-constant line. Since it can be formed by strip lines providing distributed constant, the phase shifter can be downsized, resulting in reduced size of a waveguide phased array antenna Moreover, since the micro machine switch can operate with less power, the power consumed in the switch element of a phase shifter can be reduced.

Furthermore, the TFT circuit includes the data latch circuits for simultaneously applying a driving signal to the phase shifters. Therefore, the phase shift for each phase shifter can be changed at the same time and therefore the radiation directions of all the radiating waveguides can be switched at one time.

I claim:

1. A phase controller for controlling a phase of a propagating wave from an input waveguide to an output waveguide, comprising:

a distributed-constant line coupling the input waveguide to the output waveguide;

a plurality of distributed-constant circuits each providing a different phase-shift characteristic; and a mechanically operating switch for selectively connecting the distributed-constant circuits to the distributed-constant line according to a control signal.

2. The phase controller according to claim 1, wherein the distributed-constant line, the distributed-constant circuits and the switch are formed on an insulating substrate.

3. The phase controller according to claim 1, wherein the distributed-constant line, the distributed-constant circuits and the switch are formed within an insulating substrate, wherein the insulating substrate has an input coupler formed on one side thereof and an output coupler formed on the other side thereof, the input coupler coupling the distributed-constant line to the input waveguide, and the output coupler coupling the distributed-constant line to the output waveguide.

4. The phase controller according to claim 1, wherein said mechanically operating switch is formed on a substrate having the distributed-constant line and the distributed-constant circuits formed thereon.

5. A waveguide phased array antenna apparatus comprising:

an array of a plurality of radiating waveguides arranged in parallel; and a phase controller including a plurality of phase shifters, a control signal generator, and a data distribution circuit, wherein the phase shifters are provided for the radiating waveguides, respectively, and each of the phase shifters shifts a phase of a high-frequency signal propagating from a distributing waveguide to the radiating waveguide, each of the phase shifters comprising:

a distributed-constant line coupling the distributing waveguide to the radiating waveguide;

a plurality of distributed-constant circuits each providing a different phase-shift characteristic; and a switch for selectively connecting the distributed-constant circuits to the distributed-constant line depending on a control signal received from the control signal generator, the data distribution circuit comprising:

a plurality of data latch circuits corresponding to said phase shifters, wherein each data latch circuit receives data in series from said control signal generator, and outputs said data simultaneously to a phase shifter according to a timing signal also received from said control signal generator.

6. The waveguide phased array antenna apparatus phase according to claim 5, wherein the phase shifters and the control signal generator are formed on an insulating substrate.

7. The waveguide phased array antenna apparatus according to claim 5, wherein the phase shifters and the control signal generator are formed within an insulating substrate, wherein the insulating substrate has an input coupler formed on one side thereof and an output coupler formed on the other side thereof for each of the phase shifters, the input coupler coupling the distributed-constant line to the distributing waveguide, and the output coupler coupling the distributed-constant line to the corresponding radiating waveguide.

8. The waveguide phased array antenna apparatus according to claim 5, wherein the switch is a mechanically operating switch formed on a substrate having the distributed-constant line and the distributed-constant circuits formed thereon.

9. The waveguide phased array antenna apparatus according to claim 5, wherein the distributed-constant circuits provide phase shifts of 180°, 90°, 45° and 22.5°, respectively.

10. The waveguide phased array antenna apparatus according to claim 7, further comprising a turn table mounted with the array of the radiating waveguides and the phase controller.

11. The waveguide phased array antenna apparatus according to claim 5, wherein the data distribution circuit is entirely formed on the same substrate.

12. A phase control method for controlling a phase of a propagating wave from an input waveguide to an output waveguide in a waveguide phased array antenna, comprising the steps of:

outputting control data in series from a control signal generator;

distributing said control data to a plurality of data latch circuits;

simultaneously outputting said control data from each of said data latch circuits to corresponding phase shifters;

coupling a distributed-constant line within each of said phase shifters between the input waveguide and the output waveguide; and connecting at least a selected one of a plurality of distributed-constant circuits to the distributed-constant line in accordance with said control data, wherein each of the distributed-constant circuits provides a different phase-shift characteristic.

13. The phase control method according to claim 12, wherein the at least selected one of the distributed-constant circuits is mechanically connected to the distributed-constant switch.

14. The phase control method according to claim 12, wherein the distributed-constant circuits provide phase shifts of 180°, 90°, 45° and 22.5°, respectively.

* * * * *

UNITED STATES PATENT AND TRADEMARK OFFICE

CERTIFICATE OF CORRECTION

PATENT NO. : 6,028,552
DATED : February 22, 2000
INVENTOR(S) : Chen Shuguang

It is certified that error appears in the above-identified patent and that said Letters Patent is hereby corrected as shown below:

Column 4,
Line 18, delete "S" and insert therefor -- $S_T$ --.

Column 5,
Line 23, delete "5E" and insert therefor -- 5B --;
Line 63, delete "7023" and insert therefor -- 702B --.

Column 6,
Line 9, delete "704" and insert therefor -- 704A --;
Line 42, delete "DR,.D;" and insert therefor -- DR,-$DR_N$ --.

Column 8,
Line 38, delete "94" and insert therefor -- 904 --.

Signed and Sealed this

Eleventh Day of September, 2001

Attest:

Nicholas P. Godici

NICHOLAS P. GODICI

*Attesting Officer* *Acting Director of the United States Patent and Trademark Office*